United States Patent [19]
Townsend

[11] Patent Number: 4,479,726
[45] Date of Patent: Oct. 30, 1984

[54] APPARATUS FOR CALIBRATING SURFACE TEMPERATURE MEASURING DEVICES

[75] Inventor: Perry J. Townsend, Lansdale, Pa.

[73] Assignee: Merck & Co., Inc., Rahway, N.J.

[21] Appl. No.: 479,298

[22] Filed: Mar. 28, 1983

[51] Int. Cl.³ .............................................. G01K 15/00
[52] U.S. Cl. ............................................ 374/1; 374/3
[58] Field of Search ......................................... 374/1, 3

[56] References Cited

U.S. PATENT DOCUMENTS 2,724,961 11/1955 Logue ..................................... 374/1
3,225,597 12/1965 Engelhard .......................... 374/1 X
3,776,039 12/1973 Bowen ................................ 374/1 X
4,293,916 10/1981 Del Re et al. ...................... 374/1 X
4,300,392 11/1981 Bloomer et al. .................... 374/1 X Primary Examiner—Daniel M. Yasich
Attorney, Agent, or Firm—Thomas E. Arther; Hesna J. Pfeiffer

[57] ABSTRACT

This application for calibrating surface temperature measuring devices is used in chemical processes. The apparatus is portable and comprises a cylindrical metal rod with controlled heating means of accurately known surface temperature.

2 Claims, 1 Drawing Figure

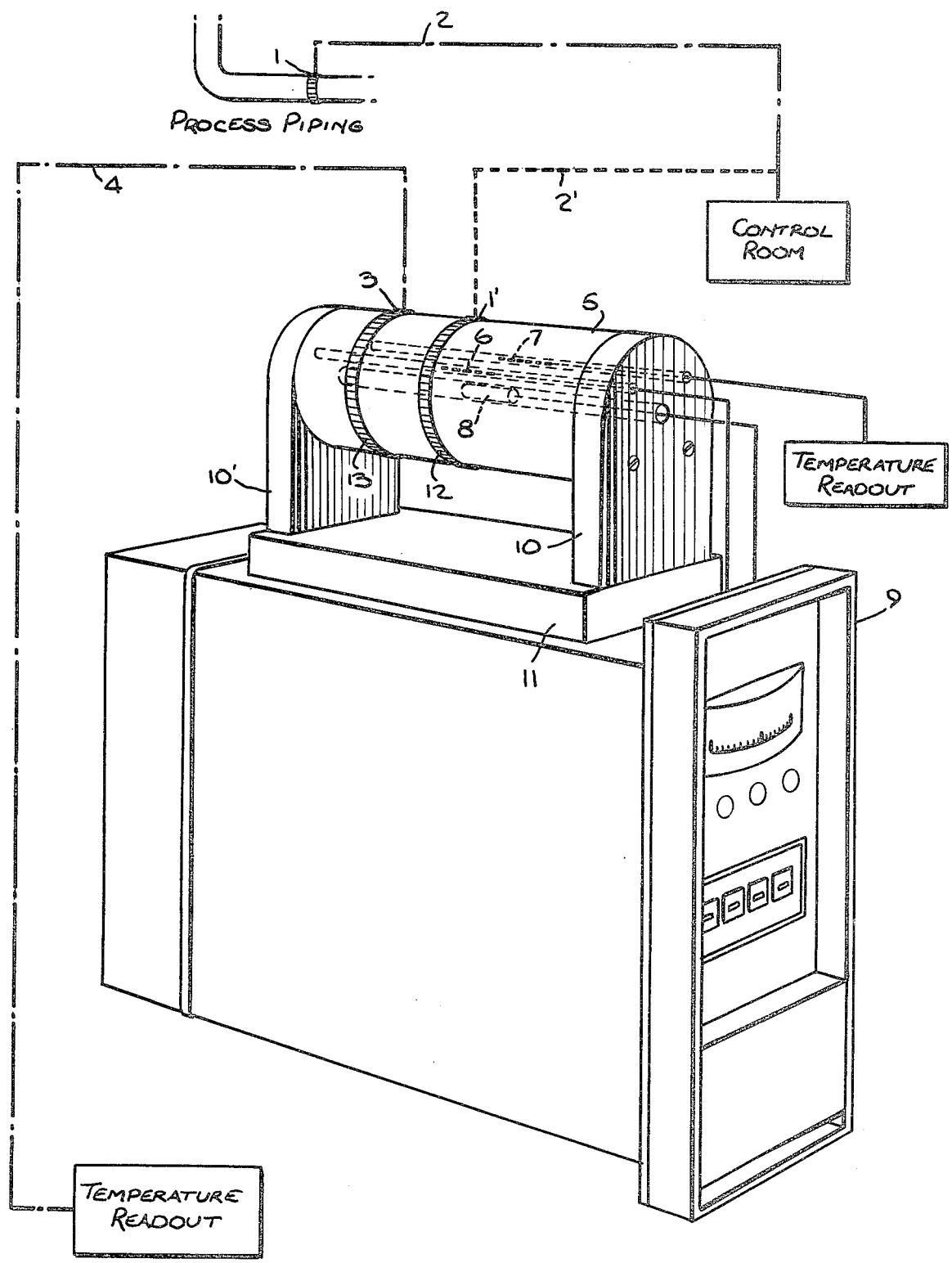

APPARATUS FOR CALIBRATING SURFACE TEMPERATURE MEASURING DEVICES

BACKGROUND OF THE INVENTION

Chemical processes especially when carried out in the liquid or gaseous phase involve handling of large volumes of material in closed systems. The material in such systems is contained in tanks and large vessels which are connected to each other by piping in order to transfer liquid from one vessel to another. Chemical processes as well as other processes involving the handling of liquids require precise temperature control for maximum efficiency. It is often difficult, inefficient, cumbersome or impractical to measure temperatures by immersion of a thermometer or other temperature measuring probe directly in the liquid being processed. One method of measuring the temperature of liquids in chemical processes is to measure the surface temperature of the vessel or pipe containing the liquid whose temperature it is desired to measure.

For this purpose there are provided relatively flat shaped temperature sensors which can be clamped or strapped to the surface of the pipe or vessel, the temperature of which it is desired to measure. In order to achieve precise temperature control, such devices must be calibrated against a known standard at the point of use, i.e., in the process area where the temperature is being measured.

A need, therefore, exists for a portable temperature calibration device whereby the accuracy of the temperature sensor can be compared to the accurate known standard and appropriate adjustments made to the process controller which is governed by the temperature sensor being calibrated.

BRIEF DESCRIPTION OF THE INVENTION

The portable temperature calibrator for surface temperature sensors of the subject invention includes in combination a relatively small cylindrical metal rod (approximately 2 inches in diameter and 5 inches long), a controlled electrical heating means located within the cylinder, a proportional output heating controller, a standardized platinum resistance thermometer probe mounted within said metal rod; said heating means and said thermometer probe being electrically connected to said heating controller, a standardized platinum resistance sensor attached to the surface of said metal rod and a temperature read-out meter electrically connected to said platinum resistance temperature sensor and optionally a second probe mounted within said rod to allow visual monitoring of the temperature.

The apparatus is assembled by mounting the metal rod on the upper housing panel of the heating controller using a mounting bracket of insulating material, preferably a solid plastic material formed of tetrafluoroethylene fluorocarbon resins sold commercially under the product name "Teflon". A $\frac{3}{8}$ inch hole is provided lengthwise through the center of the cylinder and an 85 watt cartridge heater is inserted therein and the heater is connected to the heating controller. Two additional holes of $\frac{1}{8}$ inch diameter are drilled lengthwise through the cylinder to accommodate two standardized $\frac{1}{8}$ inch platinum resistance thermometer probes. One of said probes is connected to the heating controller to control the temperature of the metal rod and the other of said probes is an optional feature which may be connected to a conventional temperature read-out meter in order to visually monitor the temperature of the rod. A standardized platinum resistance temperature sensor is strapped or clamped to the surface of the metal rod and connected to a conventional temperature read-out meter thus providing an accurate reading of the surface temperature of the simulator rod.

The above apparatus is used in the practice of the invention by setting the desired temperature on the temperature controller at the site where it is desired to calibrate a process temperature sensor used to determine the temperature of a pipeline in use. The process temperature sensor is then disconnected from the process pipeline and attached to the metal rod calibrator to compare the temperature recorded in the process control room with the known temperature of the metal rod calibrator. The difference between the temperature indicated by the process sensor and the accurately measured temperature is noted and appropriate adjustments made in the control room to include the calibration of the process sensor and record the actual temperature needed to accurately carry out the process under study. The process sensor is then returned to the process piping for accurate process control.

DESCRIPTION OF THE DRAWING

The drawing illustrates a perspective view of the apparatus of the present invention and a schematic representation of the use of such equipment in calibrating temperature sensors used to measure the surface temperatures of process piping.

As shown in the drawing, metal rod 5 is mounted between end brackets 10 and 10' which are securely fastened to base plate 11 which in turn is attached to a conventional heating controller unit 9. Into a hole provided through end bracket 10 and extending lengthwise through the center of rod 5, is placed a controlled electrical cartridge heater 8 which is connected to heating controller 9. Also, mounted in holes drilled lengthwise through rod 5 are $2\frac{1}{8}$ inch standardized platinum resistance temperature probes 6 and 7 used to control and monitor the temperature of the calibrator rod 5. Thus, for example, probe 6 is connected to heating controller 9 to signal the heating controller when the temperature set is maintained in rod 5. In addition optional probe 7 is connected separately to a conventional read-out meter providing visual monitoring of the temperature. There is also mounted on the surface of rod 5 a standardized platinum resistance sensor 3 attached by Strap 13 connected through lead 4 to a conventional temperature read-out meter providing a correct reading of the actual surface temperature of rod 5. By "actual temperature", is meant the known correct temperature measured by a standardized probe and readout which has been previously certified correct within specific limits and traceable to the National Bureau of Standards. When the desired surface temperature of rod 5 is maintained steadily, attention is turned to process sensor 1 which is attached by clamp or strap 12 to process piping, the temperature of which it is desired to ascertain. This sensor 1 is attached by lead 2 to an appropriate temperature read-out and process control equipment in the process control room. In carrying out the calibration, the process sensor 1 is released and attached at a location indicated at 1' on the surface of rod 5 of correctly known temperature and the indicated temperature by connection through control room lead at 2' is recorded. The difference between temperatures of the process sensor in location 1 and location 1' is noted and appropriate modification of the process control equipment is made based on the measured difference.

What is claimed is:

1. Portable apparatus for calibrating thermoelectric surface temperature measuring devices for use with a process control pipe line comprising in combination:
   (a.) a cylindrical shaped metal calibrator rod selectively mounted to a heater controller;
   (b.) controlled electrical heating means mounted within said rod;
   (c.) said heater controller being a proportional output heating controller;
   (d.) a standard platinum resistance thermometer probe mounted within said metal rod, said probe being connected to said proportional output heating controller;
   (e.) a second standard platinum resistance probe mounted on the surface of said rod, said probe being electrically connected to a standard temperature read-out meter; whereby a temperature sensor with the process control pipe line is calibrated by said portable calibrating apparatus.

2. Apparatus of claim 1 wherein an optional standard platinum resistance probe is mounted within said metal rod, said probe being electrically connected to a standard temperature read out meter.